F. S. THAYER.
RAMP CONTACT DEVICE.
APPLICATION FILED MAY 13, 1920.

1,369,062.

Patented Feb. 22, 1921.

Inventor
Frank S. Thayer

By Herbert E. Smith
Attorney

UNITED STATES PATENT OFFICE.

FRANK S. THAYER, OF SPOKANE, WASHINGTON, ASSIGNOR TO THAYER AUTOMATIC TRAIN AND SIGNAL CONTROL COMPANY, OF SPOKANE, WASHINGTON.

RAMP CONTACT DEVICE.

1,369,062.  Specification of Letters Patent.  Patented Feb. 22, 1921.

Application filed May 13, 1920. Serial No. 381,036.

*To all whom it may concern:*

Be it known that I, FRANK S. THAYER, a citizen of the United States, residing at Spokane, in Spokane county and State of Washington, have invented certain new and useful Improvements in Ramp Contact Devices, of which the following is a specification.

The present invention relates to an improved ramp contact device forming part of the equipment in an electrically operated train control system for railroad trains, and designed to co-act with a track-side installation comprising a ramp as set forth in a co-pending application. The device of the present invention is carried by the train, preferably two of such devices being utilized, one at each side of the truck frame of the tender of the locomotive or engine, and by the utilization of this device and its contact with the stationary ramps located at intervals within signal blocks of the railroad, the ramp of the track side installation is actuated to operate switches controlling the track circuit of the electric system; the movement of the ramp due to contact with this device closes a circuit to operate mechanism in the cab of the locomotive; and a further result of the contact of the present device with the ramp is to open a normally closed circuit including a signal in the cab of the locomotive.

With the above ends in view the invention consists in certain novel combinations and arrangements of parts as will be hereinafter more specifically set forth in the following specification and claims.

In the accompanying drawings I have illustrated one complete example of the physical embodiment of my invention especially adapted for use in connection with the electric train control system embodied in a co-pending application for patent, but it will be understood that the device is equally well adapted for use in other similar systems, the parts being herein combined and arranged according to the best mode I have thus far devised for the practical application of the principles of my invention.

Figure 1:
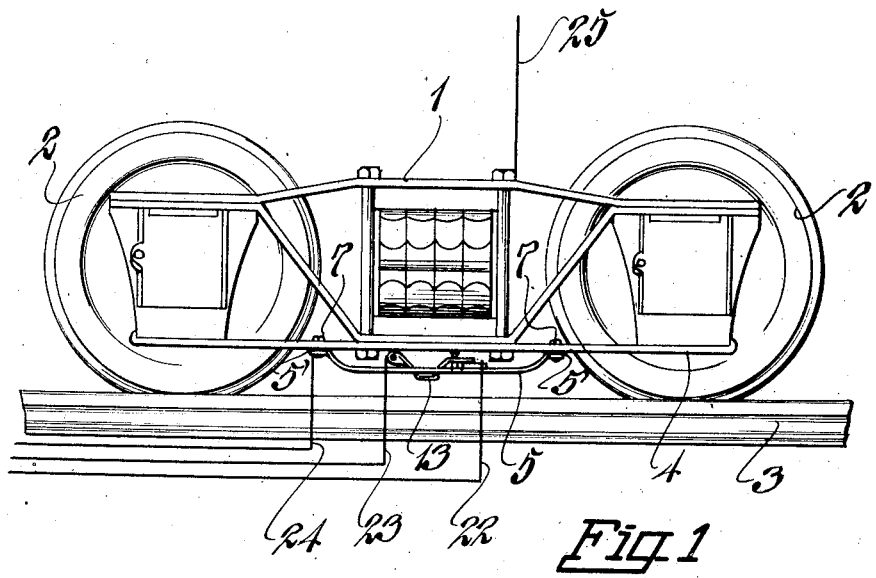
Figure 1 is a view in side elevation of a tender truck having the ramp contact device of the invention installed thereon.
Figure 2:
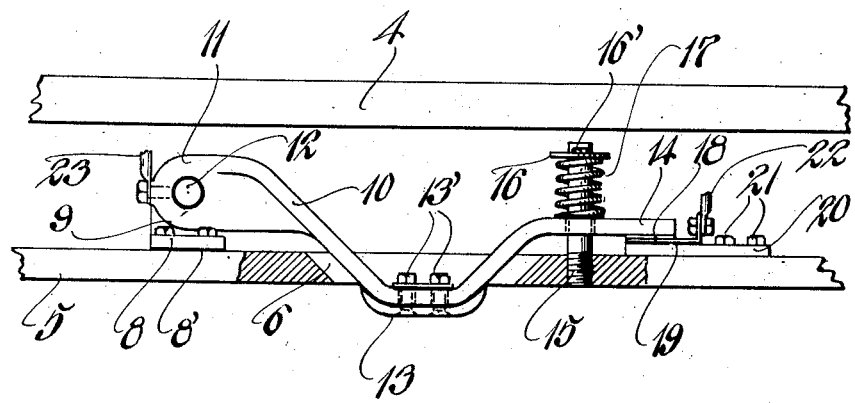
Fig. 2 is an enlarged side view of a portion of the device, partly broken away in the interest of clearness.

In the preferred form of my invention as I have illustrated it in the drawings the truck 1 is represented as a tender truck attached to the standard railway locomotive or engine, embodying the wheels 2, 2, on the track rail 3, and the lower frame bar 4 of the truck is utilized, one at each side thereof, for the installation of the device of the invention.

In converting the truck frame for use with the device I utilize an arched bar 5, of metal, located below and bolted to the underside of the frame bar 4, and insulated therefrom at 5′ where its ends are attached to the frame bar. At the longitudinal center of the arched bar 5 is provided an open slot 6 extending longitudinally of the bar, and bolts 7 are utilized to secure the ends of the bar to the frame bar, these bars being located in parallelism as seen in Fig. 1, and the arch bar disposed at the side of the track in order that the contact device may pass in frictional contact over the ramp of the track side installation not shown herein.

Adjacent one end of the slot 6 and disposed upon the top of the arch bar 5, a metal bracket 8 is attached by bolts 9, and at 8′ the bracket is electrically insulated from the bar, and a lever arm 10 has its head 11 pivoted at 12 on the bracket, and is fashioned with a depressed central portion to receive at its outer side a metallic shoe 13. The depression of the lever arm passes through the slot 6 of the arch bar and the shoe is rounded at its ends and projects entirely through the slot in order that it may contact with the ramp while the engine and tender are traveling in either direction. The shoe is insulated from the lever arm, as are also the bolts 13′ which secure the shoe to the arm, thus electrically insulating the shoe from the arm, as is the case with the bracket and arch bar.

The free end 14 of the lever arm is slotted to receive a vertically extending bolt 15 threaded into the arch bar and extending upwardly therefrom, and a washer 16 of the bolt is retained on the bolt by a cotter pin 16′ passed transversely through the bolt to retain the coiled spring 17 between the washer and upper face of the lever arm. Thus it will be apparent that the spring normally holds the arm and its shoe in horizontal position with the depressed portion of the arm and the shoe projecting through the slotted arch bar and the shoe in position to ride along a ramp located in its path.

Beneath the free end of the lever arm is interposed a metal contact plate 18, insulated at 19 from the supporting plate 20 attached on the upper face of the arch bar by bolts 21, and the terminal 22 of the engine control circuit is attached here, while the complementary terminal 23 is attached to the insulated lever arm. The lever arm is included in the engine control circuit, the current passing from the terminal, as 23, through the arm (not the shoe) direct to the contact plate 19 and out through the terminal 22, as long as the lever arm is held by its spring in contact with the plate. When the shoe, however, encounters the ramp rail at the track side, the lever arm is swung upwardly on its pivot 12 against the tension of the spring 17, separating the free end of the arm and the contact plate, thus breaking the engine control circuit, as required, which is thus demagnetized.

In Fig. 1 the terminals of a solenoid circuit are indicated at 24 as connected to the arch bar, and at 25 the ground wire is attached to the frame 1 forming part of a circuit which operates mechanism in the engine cab. A further function of the device of the present invention is to depress the ramp rail which action operates switches having control of the track circuits of the electric system as described in another application contemporary herewith.

Having thus fully described my invention, what I claim is—

1. The combination with a railway truck frame and an insulated supporting bar thereon slotted as described, of an insulated lever arm pivoted on the bar and having a portion projecting through the slotted bar, an insulated contact shoe on the projecting portion of the arm, and means for holding said arm in position to provide a normally closed electric circuit.

2. The combination of parts included in a normally closed electric circuit comprising a slotted supporting bar, an insulated lever arm pivoted on said bar and having a projection through the slot thereof, a shoe on the projecting portion of the arm, and means for holding the arm in normal position.

3. The combination with the slotted supporting bar, of an insulated lever arm pivoted thereon, and a terminal conductor attached thereto, said arm having a depressed portion passing through the slotted bar and provided with a shoe, a contact plate under the free end of the lever arm and a conductor terminal attached thereto, a guide bolt passed through a slot in said arm, and a spring on the bolt to normally hold said free end of the arm in contact with said contact plate.

In testimony whereof I affix my signature.

FRANK S. THAYER.